(12) United States Patent
Bortolussi et al.

(10) Patent No.: US 11,744,192 B2
(45) Date of Patent: Sep. 5, 2023

(54) SUPPORTING DEVICE ON A SUPPORTING POLE, IN PARTICULAR FOR CONTAINMENT WIRES OF A ROW

(71) Applicants: Claudio Bortolussi, Fiume (IT); Franco Bortolussi, Fiume (IT)

(72) Inventors: Claudio Bortolussi, Fiume (IT); Franco Bortolussi, Fiume (IT)

( * ) Notice: Subject to any disclaimer, the term of this patent is extended or adjusted under 35 U.S.C. 154(b) by 162 days.

(21) Appl. No.: 16/962,374

(22) PCT Filed: Jan. 15, 2019

(86) PCT No.: PCT/IB2019/050302
§ 371 (c)(1),
(2) Date: Jul. 15, 2020

(87) PCT Pub. No.: WO2019/145822
PCT Pub. Date: Aug. 1, 2019

(65) Prior Publication Data
US 2021/0360877 A1  Nov. 25, 2021

(30) Foreign Application Priority Data
Jan. 23, 2018  (IT) .......................... 102018000001699

(51) Int. Cl.
*A01G 17/06* (2006.01)
*A01G 17/14* (2006.01)

(52) U.S. Cl.
CPC ............. *A01G 17/06* (2013.01); *A01G 17/14* (2013.01)

(58) Field of Classification Search
CPC .. A01G 17/06; A01G 17/14; A01G 2017/065; A01G 17/08; A01G 17/04
(Continued)

(56) References Cited

U.S. PATENT DOCUMENTS 1,761,452 A * 6/1930 Paque ..................... E04H 17/10
256/57
2,227,553 A * 1/1941 Paque ..................... E04H 17/06
52/153
(Continued)

FOREIGN PATENT DOCUMENTS

EP  0 876 756 A1  11/1998
EP  0 876 757 A1  11/1998
(Continued)

OTHER PUBLICATIONS

Apr. 24, 2019 International Search Report issued in International Patent Application No. PCT/IB2019/050302.
(Continued)

*Primary Examiner* — Tien Q Dinh
*Assistant Examiner* — Kevin M Dennis
(74) *Attorney, Agent, or Firm* — Oliff PLC

(57) ABSTRACT

A supporting device on a supporting pole, in particular for at least one wire for containing row, which includes wire-holding element formed by shaped thread-like body comprising resting portion adapted to be removably rested, in use, on first portion of outer surface of supporting pole and supporting means for containment wire extending from opposite sides with respect to resting portion, and pulling and anchoring element formed by shaped thread-like body including engagement portion adapted to interact, in use, with second portion of outer surface of supporting pole opposite to first portion and elastically deformable anchoring means which extend substantially perpendicularly and from opposite sides with respect to engagement portion and adapted to cooperate with second portion of outer surface of supporting pole.

16 Claims, 9 Drawing Sheets

(58) Field of Classification Search
USPC .................................................. 47/46, 47, 44
See application file for complete search history.

(56) References Cited

U.S. PATENT DOCUMENTS

| | | | | |
|---|---|---|---|---|
| 3,169,750 A * | 2/1965 | Weed | ...................... | E04H 17/10 |
| | | | | 256/57 |
| 4,099,299 A * | 7/1978 | Bruggert | ................ | A01G 17/08 |
| | | | | 24/336 |
| 4,270,581 A * | 6/1981 | Claxton | ................. | E04H 17/10 |
| | | | | 140/57 |
| 4,619,440 A * | 10/1986 | Thevenin | ................ | E04H 17/12 |
| | | | | 256/DIG. 5 |
| 5,501,035 A * | 3/1996 | Downer | ................ | A01G 17/06 |
| | | | | 256/57 |
| 5,916,028 A * | 6/1999 | Downer | ................ | A01G 17/06 |
| | | | | 248/302 |
| 6,405,479 B1 * | 6/2002 | Sherman | ................ | A01G 17/08 |
| | | | | 47/46 |
| 6,434,883 B1 * | 8/2002 | Martin | ................... | A01G 17/06 |
| | | | | 140/82 |
| 6,973,751 B2 * | 12/2005 | Pierce, Jr. | ............. | A01G 17/06 |
| | | | | 47/46 |
| 8,246,013 B2 * | 8/2012 | Mauer | ..................... | E01F 15/06 |
| | | | | 256/48 |
| 10,202,730 B2 * | 2/2019 | Neusch | ................... | E04H 17/04 |

FOREIGN PATENT DOCUMENTS

ES         1069817 U   *   2/2009
ES        1 069 817 U      5/2009

OTHER PUBLICATIONS

Apr. 24, 2019 Written Opinion of the International Searching Authority issued in International Patent Application No. PCT/IB2019/050302.

* cited by examiner

SUPPORTING DEVICE ON A SUPPORTING POLE, IN PARTICULAR FOR CONTAINMENT WIRES OF A ROW

TECHNICAL FIELD OF THE INVENTION

The present invention relates to a supporting device, or hook, on a supporting pole, in particular for the removable fastening of containment wires, or movable wires, of a row of plants, such as for example a vineyard or an orchard. The supporting device according to the present invention can also be used for the removable fastening of different articles, such as for example fence networks or panels, on a supporting pole.

PRIOR ART

In agriculture, and in particular in the viticulture sector, it is known to provide supporting structures for plants consisting of rows of poles fixed in the ground to form rows. The poles are spaced from each other and are interconnected in their portions protruding from the ground by a horizontal wire, called "bearing wire", which is fixed on said poles at a suitable height from the surface of the ground.

On the two poles at the ends of each row, called "head poles", at least one pair of parallel wires is also fixed and tangentially arranged on respective sides of each pole of the same row, commonly called "containment wires" or "movable wires", because during the various cultivation stages the plants are moved to different heights from the ground to contain and organize the growing vegetation according to a desired configuration.

In the intermediate poles of the row, included between the head poles, supports or hooks are suitably provided for the temporary fastening of the movable wires to one or more heights with respect to the ground.

In the winter season when the vine shoots have very reduced lengths or are completely absent, the pairs of movable wires are placed in a position close to the ground. In spring and summer seasons when the plants produce an increasingly lush vegetation, each pair of movable wires is placed in a position progressively more distant from the ground according to the direction orthogonal to the ground, harnessing the vegetation between the wires of each pair, thus organizing its development according to a desired configuration and to ensure to the vegetative part and the fruits the best possible exposure to the sun and air, facilitating the process.

The movement of the containment wires, that is, the release of the movable wires previously arranged at a first height with respect to the ground and their subsequent re-engagement to a second height different from the first, can be obtained either manually or mechanically, through suitable equipment, particularly advantageous in the case of vineyards with a vast extension, in which the rows can include a number of plants of the order of a few thousand.

Historically, the supporting posts used in the vineyards were made of wood; consequently, it was quite simple to fix the supporting elements for the temporary fixing of the movable wires on their body, at desired heights. For resistance and uniformity reasons, the wooden poles have been gradually replaced with metal or concrete poles of various shapes and sections, such as for example circular, square, polygonal but also with T section or open section.

In the case in which the poles of the rows have open section, the French patent FR2838603 shows a temporary supporting device for movable wires made of a harmonic steel wire suitably folded in such a way as to define an elastic engagement portion adapted to be inserted elastically inside of the cavity defined by the pole, and a coupling portion, adapted to project from the outer surface of the pole to essentially form a supporting hook in which the containment wire can be inserted.

Although these supporting elements function satisfactorily when used for the construction of fences, in which it is necessary to support only the weight of the wires, they are not however reliable in the case of use as support for wires for containing a vineyard, as the weight of the fruits and of the vegetation, especially during the maximum growth phase, can be quite high, involving the possibility of sliding thereof the supporting device inside the pole and the consequent loss of functionality of the entire cultivation system.

Moreover, not all the open section poles allow the elastic engagement inside their cavity as they do not have suitable undercuts in which to elastically abut the engagement portions of the supporting elements.

Alternatively, metal poles have been proposed in which the supporting hooks for the movable wires are obtained directly on the shaft thereof; in particular, at the edges of the pole, and at desired heights, pairs of "notches" are formed, defined by through openings, distributed along the height of the pole and suitably shaped to substantially form support grooves in which respective portions of movable wires can be temporarily retained.

In order to prevent accidental oscillatory movements of the movable wires from causing them to escape from the groove, the openings may have oblique inlet, or the support grooves may define suitable undercuts; therefore, the movement of insertion and extraction of the involved movable wire portions must be carried out with operations which are rather complicated to be carried out in a synchronized manner, especially if the displacement of the containment wires is carried out with the use of mechanized equipment.

Moreover, since such openings are generally obtained by laser cutting or shearing, the edges thereof can be very sharp, even breaking the steel wires during the handling thereof.

To overcome these drawbacks, the French patent application FR3012198 describes a supporting device adapted to cooperate with the openings made on the shaft of said pole for the temporary fastening of a containment wire. Such a supporting device is essentially obtained from an elastically deformable wire curved in space to define two S-shaped portions substantially symmetrical with respect to a vertical symmetry plane, connected by a connecting portion lying on a plane substantially perpendicular to the symmetry plane. In this way, the supporting device thus obtained has an elasticity both along directions perpendicular to said vertical plane of symmetry, and also along directions parallel to the same plane.

The portions close to the free ends of the wire forming the supporting device are adapted to be elastically inserted inside an opening provided on the shaft of the pole, while the portions close to the connecting portion thereof are arranged projecting with respect to the outer surface of the pole to form a sort of hook inside which the containment wire is slidably inserted and temporarily resiliently retained therein due to the shape of the supporting device.

A drawback that is evident in the use of such supporting elements arises from the fact that the elastic portion that is inserted inside the pole through the openings obtained on the shaft retains the entire supporting device, weighing exclusively on the edges which define the opening itself; this may not provide a sufficient degree of safety against the accidental rotation of the supporting device, caused for example by impacts with the arms of the movable wire handling device or by the action of wind on the vegetation, which would easily cause the escape of the device from the respective opening.

Moreover, during the winter season, when the containment wires are positioned at a lower height and close to the ground, it would be advisable to orient the portion forming the hook in such a way as to have the concavity facing downwards, so as to prevent the wires from accidentally sliding along the shaft of the pole, thus interfering with the development of the vegetation. Of course, with the hooks shown in the above patent this is not possible.

SUMMARY OF THE INVENTION

The task of the present invention is to provide a supporting device on a supporting pole, in particular for a wire for containing a row, capable of overcoming the drawbacks of the prior art.

Within the scope of the aforementioned task, an object of the present invention is to provide a supporting device for the temporary fastening of containment wires, or movable wires, of rows of plants on intermediate poles which is simple to implement and install, but which at the same time provides an optimal support of the wires on a pole, preventing both the escape from the latter and the undesired or uncontrolled sliding of the wire in the prevailing direction of development of the pole, remaining firmly constrained in the selected position.

Another object is to provide a supporting device capable of following the growth of the plant along the pole continuously, and therefore capable of being positioned continuously along the pole as a function of the plant growth.

Another object is to provide a supporting device in which the installation operation on the pole is simple and easy for the user and does not require the application of excessive forces or inconvenient or poor safety operations.

A further object of the present invention is to provide a temporary supporting device which can be easily disassembled and reused several times without losing its effectiveness.

Still another object of the invention is to provide a supporting device for the temporary fastening of movable wires which guarantees maximum flexibility of use, being able to be associated with poles having a different geometry section.

Last but not least, another object of the present invention is to provide a supporting device that achieves the above-mentioned task and objects at competitive production costs, so that its use is advantageous also from an economic point of view, and that it can be obtained with the usual and known plants, machinery and equipment.

The above task and objects as well as others that will better appear hereinafter are achieved by a supporting device on a supporting pole, in particular for a wire for containing a row, as defined by the appended claims.

BRIEF DESCRIPTION OF THE FIGURES

Advantages and features of the invention will be apparent from the following description, made by way of a non-limiting example with reference to the accompanying figures, in which.

DETAILED DESCRIPTION OF THE INVENTION

The inventive concept underlying the present invention consists essentially in providing a supporting device on a supporting pole, in particular for at least one wire for containing a row, which comprises:
  a wire-holding element formed by a shaped thread-like body, and
  a pulling and anchoring element also formed by a shaped thread-like body.

The wire-holding element comprises in turn:
  a resting portion adapted to be removably resting on at least a first portion of the outer surface of the supporting pole, and
  supporting means for the containment wire which extend from opposite sides with respect to the resting portion.

The pulling and anchoring element comprises:
  an engagement portion adapted to interact, at least partially, with at least a second portion of the outer surface of the supporting pole opposite the first portion, and
  elastically deformable anchoring means which extend substantially perpendicularly and on opposite sides with respect to the engagement portion and adapted to cooperate with said at least a second portion of the outer surface of the supporting pole.

The engagement portion of the pulling and anchoring element is adapted to engage the wire-holding element and applying a pulling force thereto capable of removably anchoring the wire-holding element on the first portion of the outer surface of the supporting pole through the anchoring means cooperating with the second portion of the outer surface of the pole.

In the following description, terms such as "above", "below", "upper", "lower", "top", "bottom" or the like refer to a supporting device in its normal working order, i.e. in use, as shown in the accompanying figures.

Figure 1:
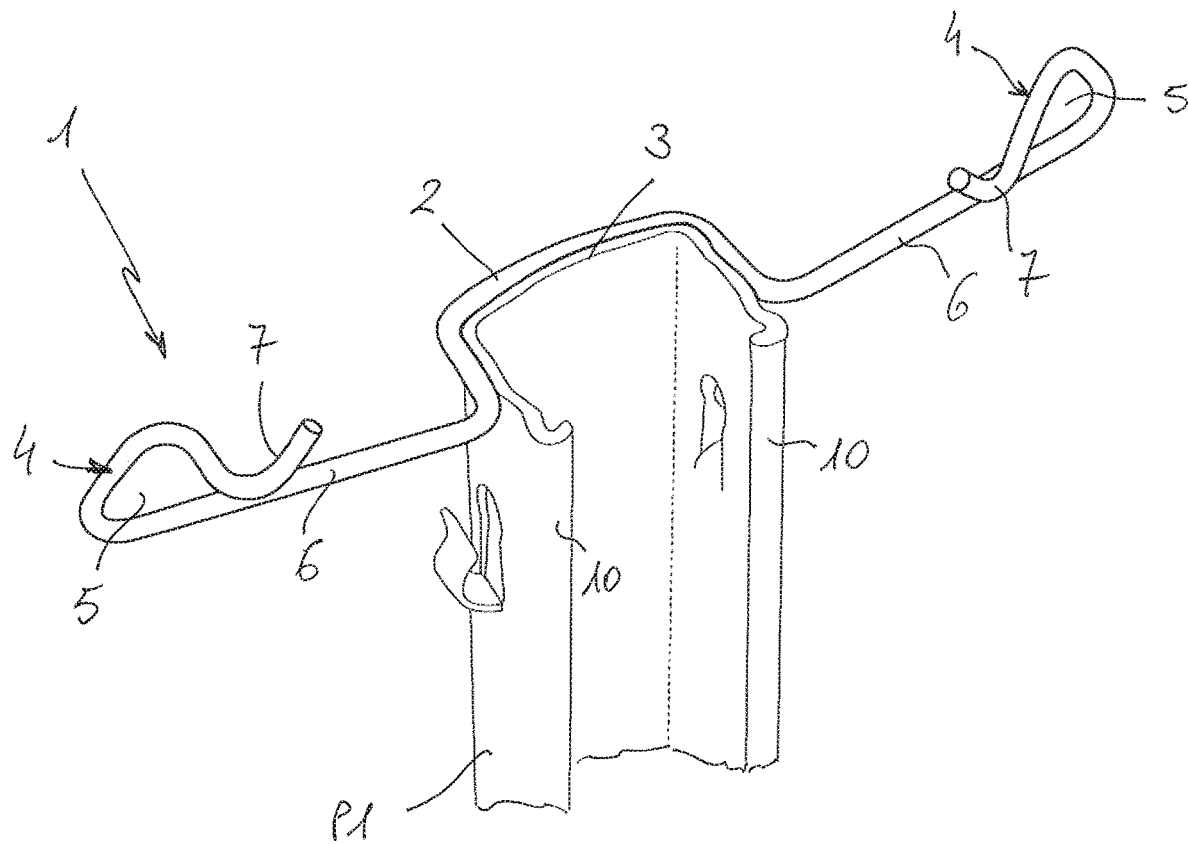
FIGS. 1 and 2 are perspective views of a first embodiment of a supporting device according to the present invention.
Figure 2:
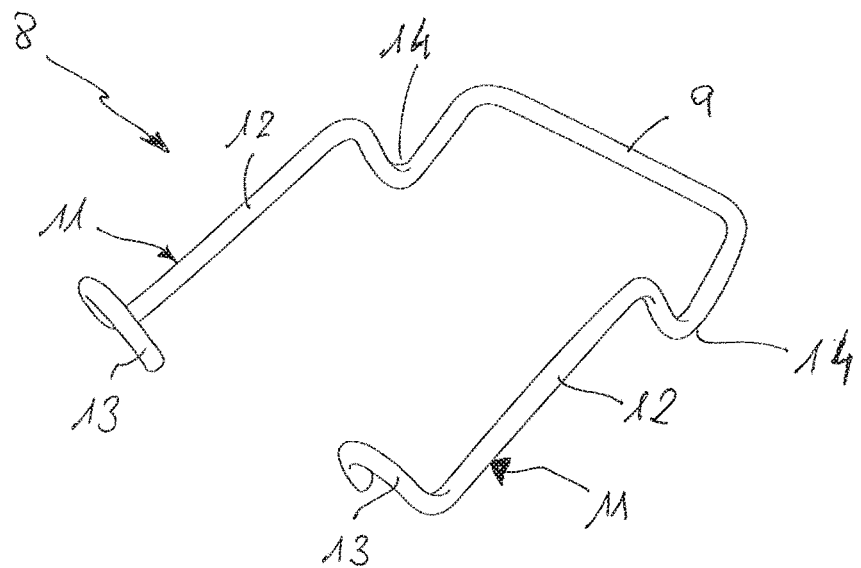
Figure 3:
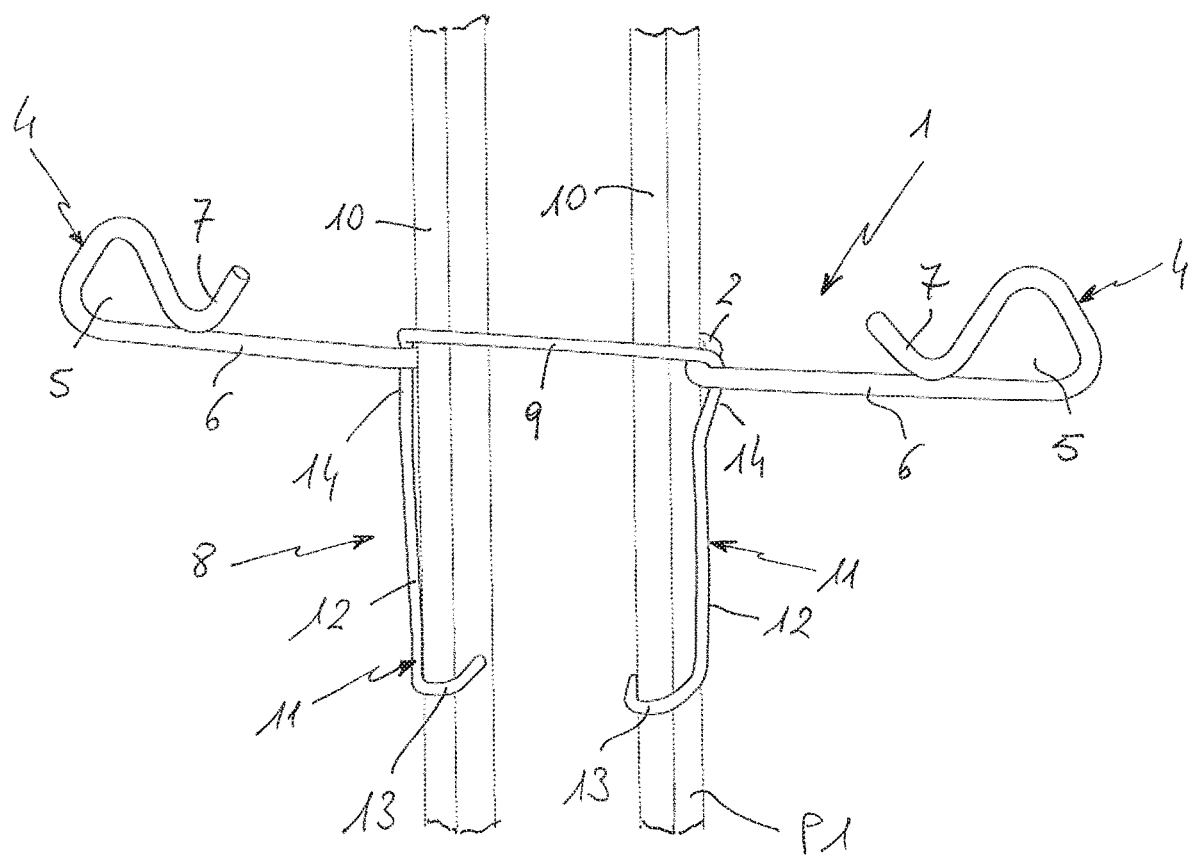
FIG. 3 shows the supporting device of the preceding figures applied to a supporting pole of a row of plants.

With reference to the accompanying figures, FIGS. 1 to 3 illustrate a first embodiment of a supporting device according to the present invention, which comprises a wire-holding element 1 formed by a shaped thread-like body which includes a resting portion 2 adapted to be removably resting on at least a first portion 3 of the outer surface of a supporting pole P1. The resting portion 2 is suitably shaped to be coupled and adapted to the shape of the section of the first portion 3 of the outer surface of the pole P1. In the embodiment illustrated in FIG. 1, the resting portion 2 is essentially shaped like a rectangle, possibly with the horizontal stretch arched, to adapt to and surround a portion 3 of the outer surface of the pole P1 having a rectangular cross-section or a convex side.

On opposite sides with respect to the resting portion 2, respective supporting means 4 extend, adapted to receive and support a containment wire (not shown) of a row of plants on the supporting pole P1. The supporting means 4 are obtained by means of suitable bends at the opposite ends of the thread-like body so as to form a pair of eyelets 5 adapted to support a through wire and are joined to the resting portion 2 by respective substantially straight stretches 6, which may have different lengths depending on the distance from pole P1 at which the containment wires are to be arranged.

Advantageously, the end portions 7 of the supporting means 4 are bent so as to be in contact with the rectilinear stretches 6, or offset and slightly spaced with respect to them, so as to create an obstacle to the accidental escape of the containment wire passing through the eyelets 5. The insertion of the wire inside the eyelets 5 by the operator takes place by applying a slight pressure on the wire to overcome the elastic resistance of the end part 7 or by tilting it to pass through the space created due to the misalignment with respect to the straight sections 6. Again advantageously, the latter can be further bent to essentially form an "S" for the purpose of creating a sort of opening to insert the wire.

The wire-holding element 1 is rested on the pole P1 so that the resting portion 2 at least partially embraces the first portion 3 of the pole P1, as exemplified in FIG. 1, and the pair of eyelets 5 of the supporting means 4 is arranged vertically with respect to the resting plane of pole P1 in such a way as to allow the passage and the support of the wires along axes parallel to each other and perpendicular to the axis of pole P1.

The supporting device further comprises a pulling and anchoring element 8 also formed by a shaped thread-like body which includes an engagement portion 9 adapted to interact, at least partially, with at least a second portion 10 of the outer surface of the pole P1 opposite to the first portion 3, and elastically deformable anchoring means 11 which extend substantially perpendicularly from the opposite ends of the engagement portion 9; the anchoring means 11 comprise a pair of arms 12 whose free ends are bent to form respective hooks 13.

Advantageously, between the opposite ends of the engagement portion 9 and the respective arms 12 of the anchoring means 11, suitable engagement and centering means 14 are provided, obtained by bending the thread-like body; the engagement and centering means 14 are essentially shaped like a "V" and extend substantially perpendicular to the engagement portion 9.

The method of use of the supporting device according to the present invention, referred to in the first embodiment described above but also applicable to the subsequent embodiments which will be described below, is as follows: the resting portion 2 of the wire-holding element 1 is supported in contact with the first portion 3 of the surface of the pole P1 so that the pair of eyelets 5 of the supporting means 4 is arranged vertically with respect to the resting plane of the pole P1, as exemplified in FIG. 1.

Thereafter, the pair of arms 12 of the pulling and anchoring element 8 is inserted on the opposite side of the pole P1 so that the arms 12 or, if present, the V-shaped engagement and centering means 14 engage the wire-holding element 1 at the rectilinear portions 6 adjacent to the resting portion 2. The possible engagement and centering means 14 carry out the function of centering the wire-holding element 1 since the latter is hooked at the vertices of the V so as to ensure correct positioning with the pulling and anchoring element 8.

Once the pulling and anchoring element 8 has hooked the wire-holding element 1, the operator applies a pulling force to the arms 12 to make the engagement portion 9 abut against the second portion 10 of the pole P1 opposite to the first portion 3 through a small rotation of the pulling and anchoring element 8 with respect to the resting portion 2. As a result of the reaction force exerted by said second portion 10 against the engagement portion 9, the operator can anchor the free ends of the arms 12 provided with the hooks 13 on the second portion 10 of the pole P1 by elastic deformation of the arms 12, thus obtaining the configuration shown in FIG. 3.

In this way, the wire-holding element 1 is compressed against the first portion 3 of the pole P1 by effect of the tensile force applied by the pulling and anchoring element 8, which is firmly anchored to the second portion 10 of the pole P1 due to the deformation spring to which the arms 12 of the anchoring means 11 are subjected. The resulting technical effect is a stable and secure anchoring of the supporting device of the pole P1 in the selected position, as shown in FIG. 3.

If the engagement and centering means 14 are also advantageously present, the rotation and elastic deformation of the pulling and anchoring element 8 as a result of the application of the pulling force is facilitated since the engagement with the wire-holding element 1 has greater stability.

From the foregoing, it is therefore clear that the present invention achieves the aims and advantages initially envisaged: a device has been devised to support a wire for containing a row on a supporting pole capable of overcoming the drawbacks of the prior art, in particular, a supporting device for the temporary fastening of containment wires, or movable wires, of rows of plants on intermediate poles, which is simple to construct and install and which at the same time guarantees optimal support of the wires on the pole; in fact, the stable anchoring in tension of the wire-holding element 1 by the pulling and anchoring element 8 on the pole P1 prevents undesired or uncontrolled sliding of the wire-holding element 1 in the prevailing development direction of the pole P1, remaining firmly constrained in the selected position.

Moreover, the ease of removal of the device, simply disengaging the hooks 13 from the pole P1 due to elastic deformation of the arms 12, allows following the growth of the plant along the pole continuously, since there are no pre-established positions for coupling the device along the pole P1, and therefore the device can be positioned continuously along the pole according to the growth of the plant.

The ease of installation and removal of the device from the pole, in particular without the use of tools, allows it to be removed and reused several times without losing its effectiveness.

A further advantage lies in the maximum flexibility of use of the device, being able to be associated with poles having a different geometry section simply by varying the configuration of the resting portion 2 of the wire-holding element 1.

Figure 4:
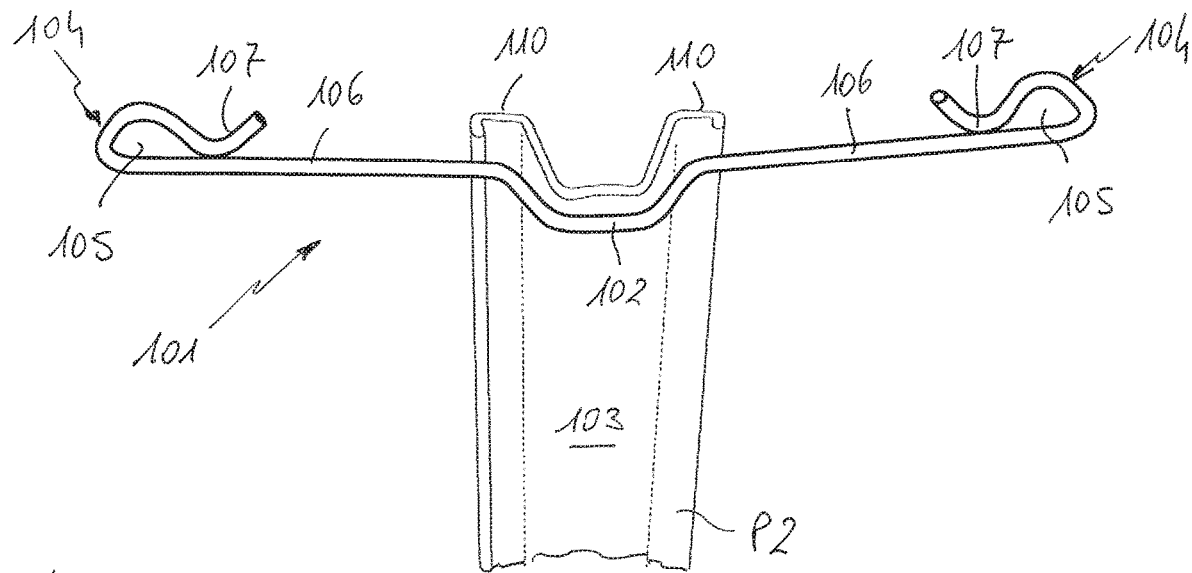
FIGS. 4 and 5 show, according to perspective views, a second embodiment of a supporting device according to the present invention.
Figure 5:
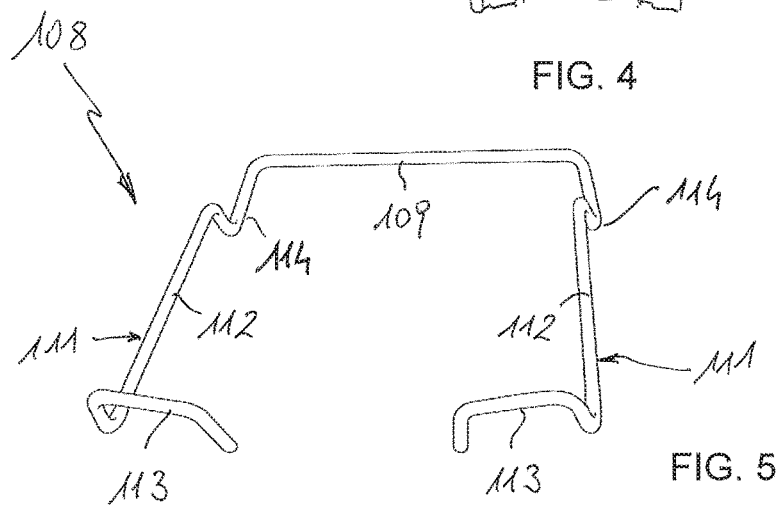
Figure 6:
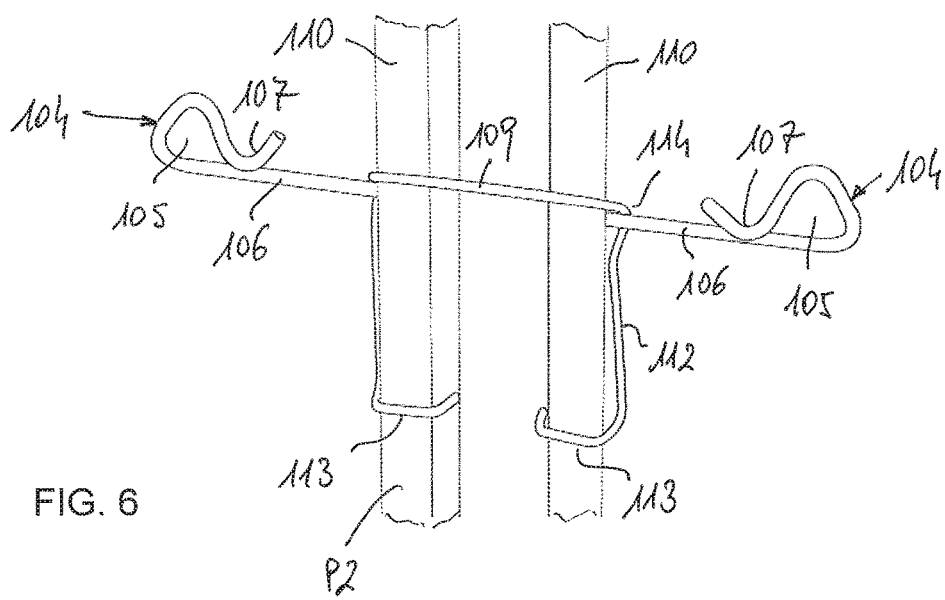
FIG. 6 shows the supporting device of the preceding embodiment applied to a supporting pole of a row of plants.

For example, FIGS. 4 to 6 show a second embodiment of the device, in which the resting portion 102 of the wire-holding element 101 is essentially arched or in the form of an isosceles trapezium to be coupled and adapted to the counter-shaped shape of the first portion 103 of the outer surface of the pole P2.

On opposite sides with respect to the resting portion 102, respective supporting means 104 extend, adapted to receive and support a containment wire (not shown) of a row of plants on the supporting pole P2. The supporting means 104 are obtained by means of suitable bends at the opposite ends of the thread-like body so as to form a pair of eyelets 105 adapted to support a through wire and are joined to the resting portion 102 by respective substantially straight stretches 106, which may have different lengths depending on the distance from pole P2 at which the containment wires are to be arranged.

Advantageously, the end portions 107 of the supporting means 104 are bent so as to be in contact with the rectilinear stretches 106, or offset and slightly spaced with respect to them, so as to create an obstacle to the accidental escape of the containment wire passing through the eyelets 105. Again advantageously, the end parts 107 can be further bent to essentially form an "S" for the purpose of creating a sort of opening to insert the wire.

The pulling and anchoring element 108 illustrated in FIG. 5, which makes up the supporting device according to the present invention, includes an engagement portion 109 adapted to interact, at least partially, with a second portion 110 of the outer surface of the pole P2 opposite to the first portion 103, and elastically deformable anchoring means 111 which extend substantially perpendicularly from the opposite ends of the engagement portion 109; the anchoring means 111 comprise a pair of arms 112 whose free ends are bent to form respective hooks 113.

Advantageously, between the opposite ends of the engagement portion 109 and the respective arms 112 of the anchoring means 111, suitable engagement and centering means 14 are provided for engaging the wire-holding element 101 in the optimal position in the area of the rectilinear stretches 106 adjacent to the engagement portion 102. The engagement and centering means, which extend substantially perpendicular to the engagement portion 109, are obtained by bending the thread-like body to be essentially configured in a "V" shape.

The functional and operative modes of the second embodiment are the same as those already described for the first embodiment, and the anchoring of the wire-holding element 101 on the pole P2 by means of the pulling and anchoring element 108 is shown in FIG. 6.

Figure 7:
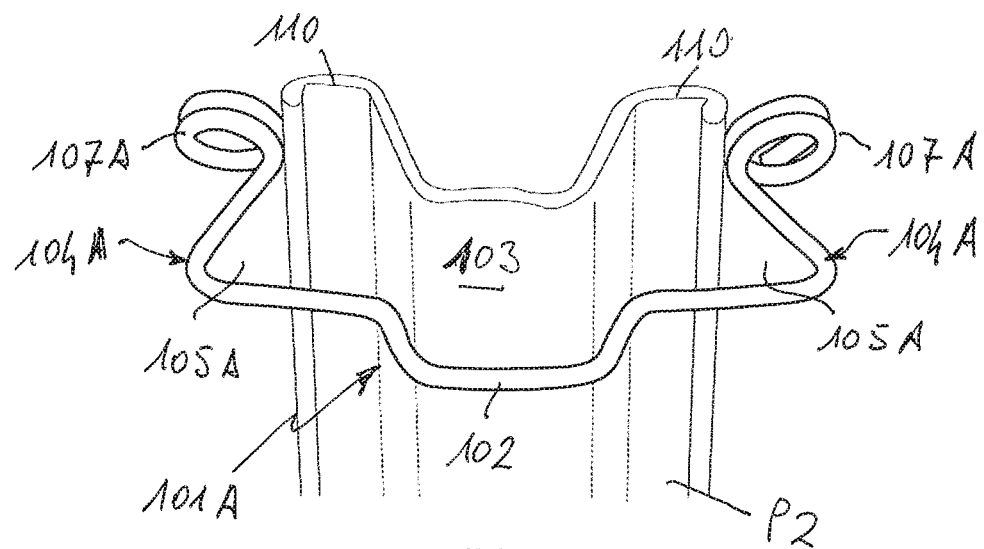
FIGS. 7 and 8 show an alternative embodiment with respect to the second embodiment illustrated in FIGS. 4 and 5.
Figure 8:
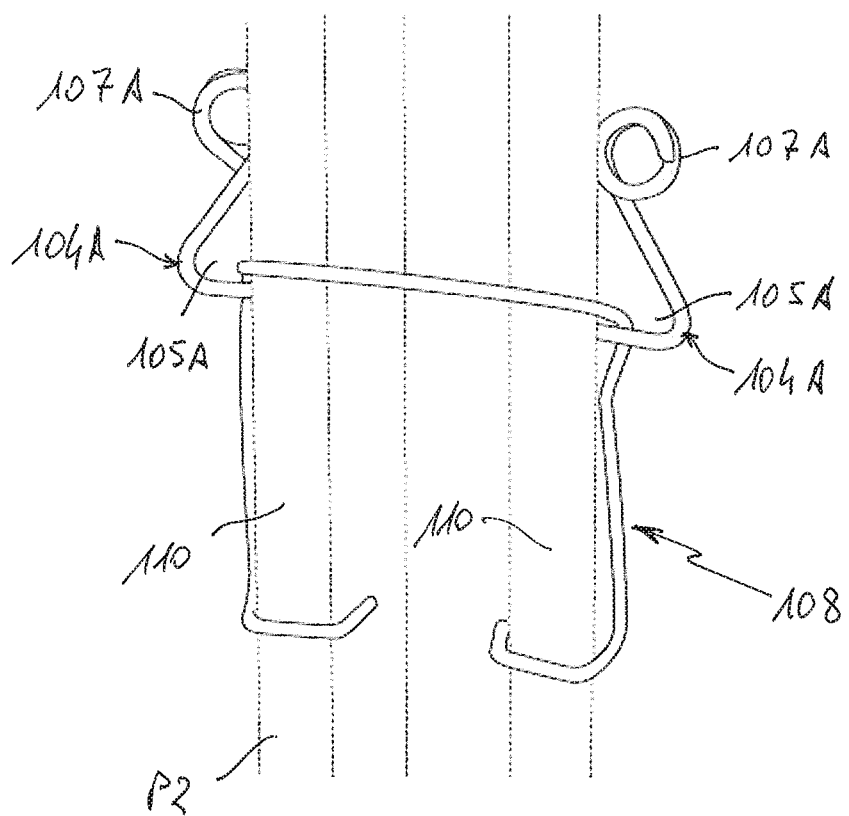

According to an alternative embodiment, shown in FIGS. 7 and 8, the supporting means 104A of the wire-holding element 101A can be configured as "V", resulting in a pair of eyelets 105A of similar shape; the end portions 107A of the supporting means are instead curled bent and configured to remain in contact, in use, with the pole P2 in order to create an obstacle to the accidental escape of the containment wire passing through the eyelets 105A; the insertion of the wire by the operator occurs by elastic deformation of one of the arms of the "V" forming the supporting means 104A. The anchoring of the wire-holding element 101A on the pole P2, shown in FIG. 8, is obtained by means of a pulling and anchoring element 108 similar to that in FIG. 5.

FIGS. 9 to 13 show a third embodiment of the device according to the present invention, in which the wire-holding element 201, or 201A according to an alternative embodiment, has a resting portion 202 having an essentially "W" shape to be coupled to an essentially counter-shaped first portion 203 of a pole P3.

Figure 9:
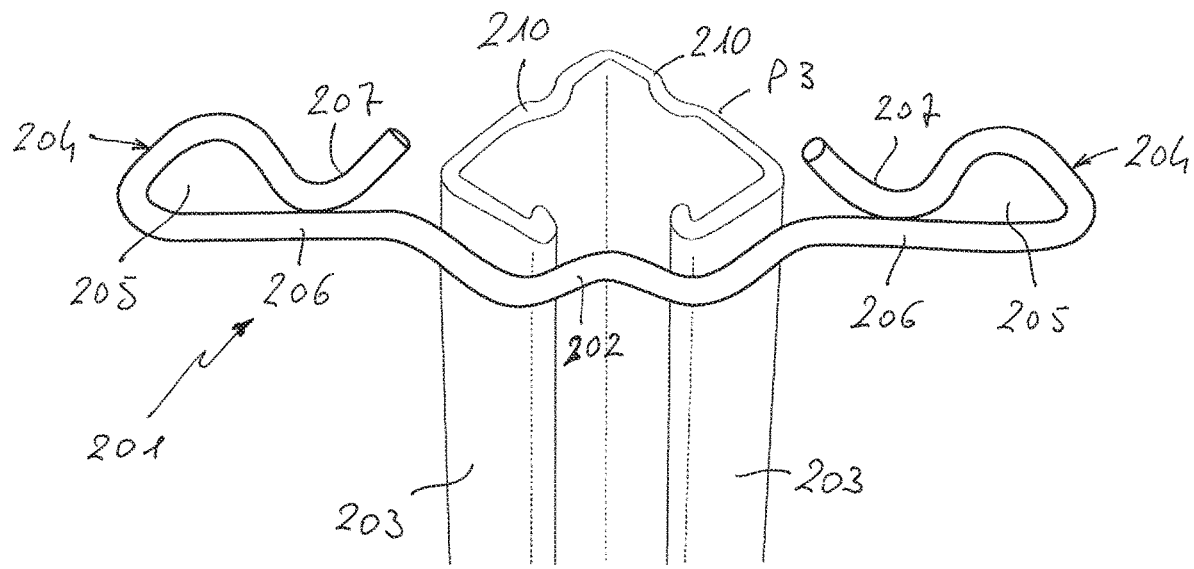
FIGS. 9 and 10 show, according to perspective views, a third embodiment of a supporting device according to the present invention.

Also in this case, the eyelets of the supporting means can be shaped as shown in FIG. 9, where the supporting means 204 are obtained by suitable bends at the opposite ends of the thread-like body so as to form a pair of eyelets 205 adapted to support a through wire and are joined to the resting portion 202 by respective substantially straight stretches 206 whose end portions 207 are advantageously bent to create an obstacle to the accidental escape of the containment wire passing through the eyelets 205, as already described above or, as exemplified in FIG. 12, they are "V" shaped, resulting in a pair of eyelets 205A of similar shape and in which the end portions 207A are curled and configured to remain in contact, in use, with the pole P3 to create an obstacle the accidental escape of the containment wire.

Figure 10:
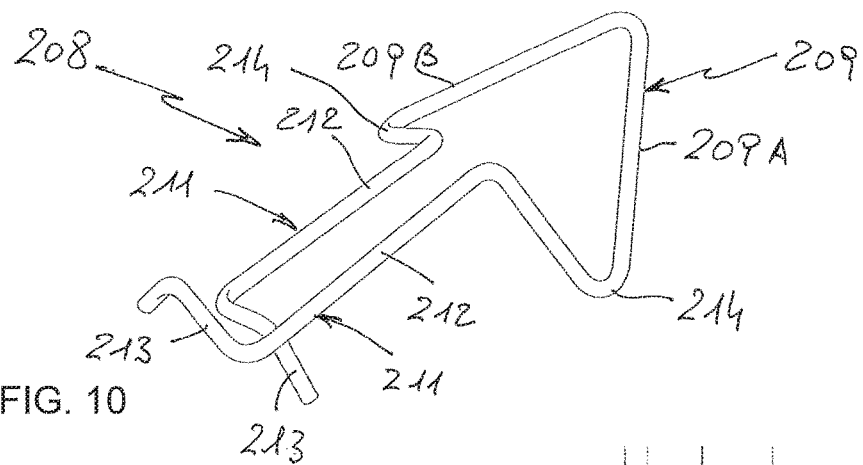

The pulling and anchoring member 208 which makes up the supporting device according to the present invention, illustrated in FIG. 10, includes an engagement portion 209 which comprises a first segment 209A and a second segment 209B arranged angled to each other to be adaptable and interact with a pole P3 having a second portion 210, opposite to the first portion 203, with an essentially triangular section. The elastically deformable anchoring means 211 extend essentially perpendicularly from the opposite ends of the respective segments 209A, 209B and comprise a pair of arms 212 whose free ends are bent to form respective hooks 213 adapted to anchor on the second portion 210 of the pole P3.

Advantageously, between the opposite ends of the segments 209A, 209B of the engagement portion 209 and the respective arms 212 of the anchoring means 211, suitable engagement and centering means 214 are provided for engaging the wire-holding element 201 in the optimal position in the area of the rectilinear stretches 206 adjacent to the engagement portion 202. The engagement and centering means, which extend substantially perpendicular to the engagement portion 209, are obtained by bending the thread-like body to be essentially configured in a "V" shape.

Figure 11:
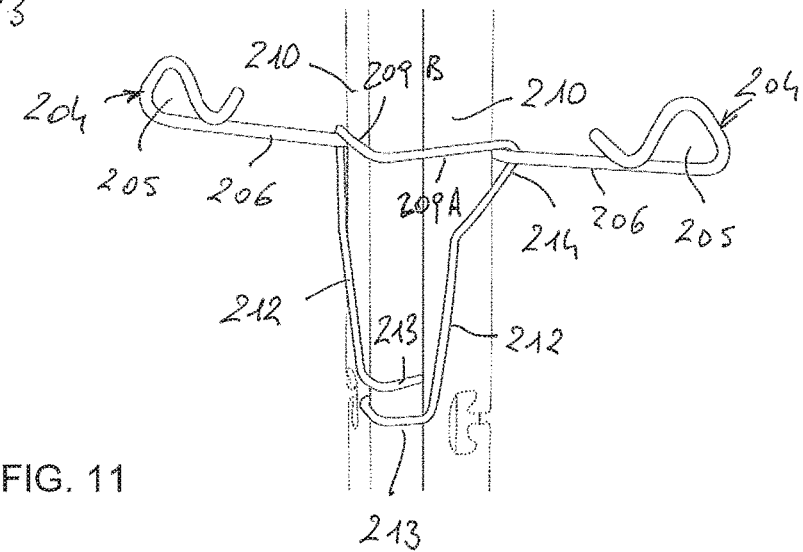
FIG. 11 shows the supporting device of the preceding embodiment applied to a supporting pole of a row of plants.
Figure 12:
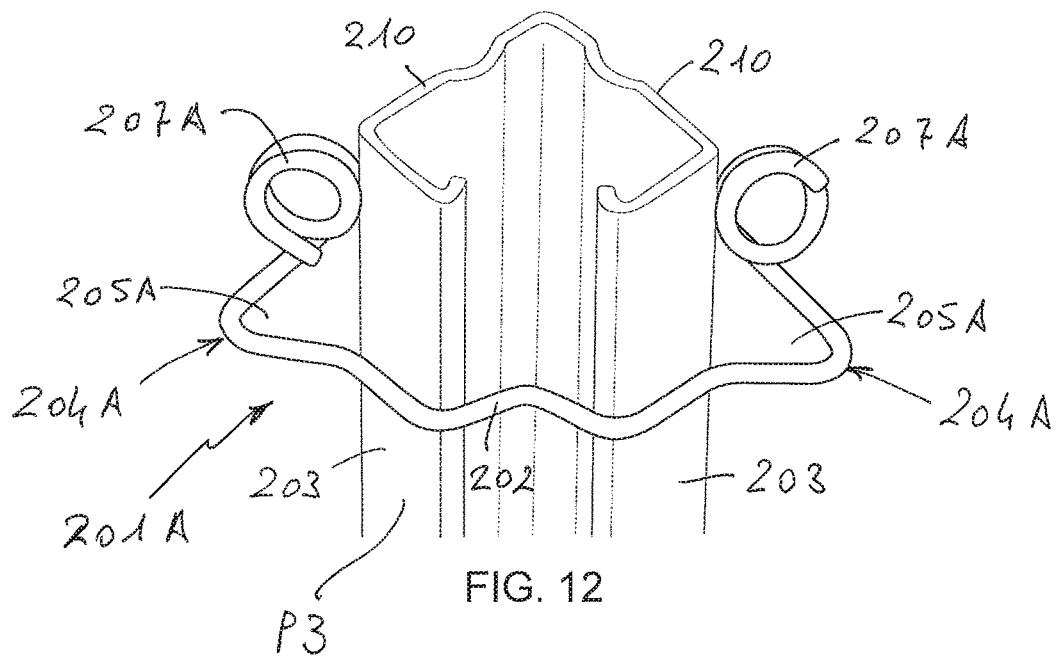
FIGS. 12 and 13 show an alternative embodiment with respect to the third embodiment illustrated in FIGS. 9 and 10.
Figure 13:
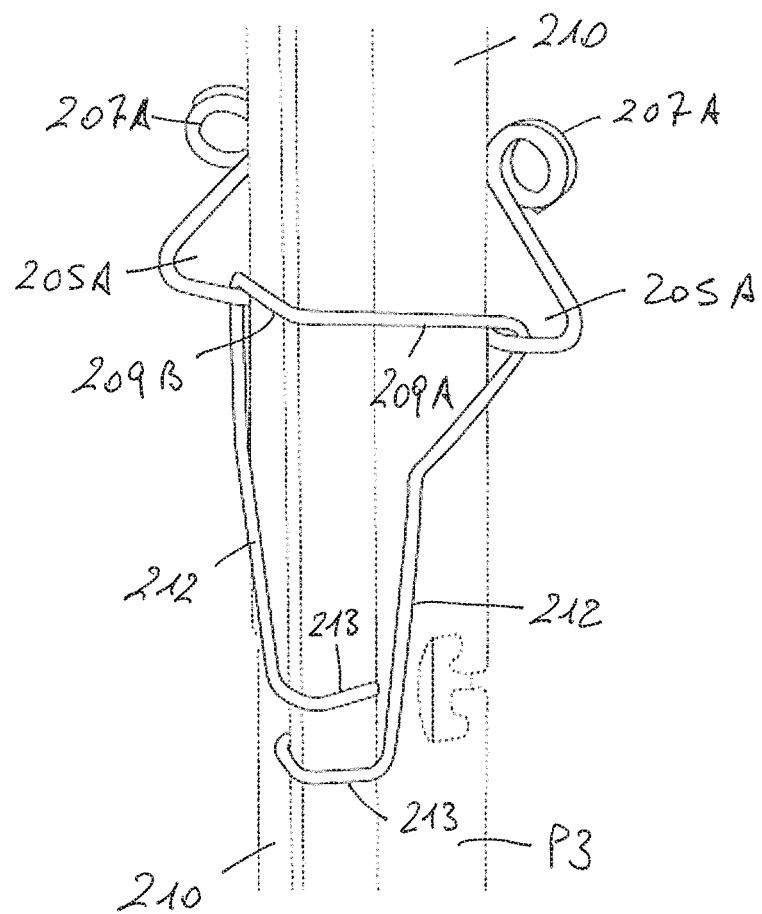

The functional and operative modes of the third embodiment are the same as those already described for the first embodiment, and the anchoring of the wire-holding element 201 on the pole P3 by means of the pulling and anchoring element 208 is shown in FIG. 11, while the anchoring of the alternative embodiment in FIG. 12 is shown in FIG. 13.

FIGS. 14 to 18 show a fourth embodiment of the device according to the present invention, in which the wire-holding element 301, or 301A according to an alternative embodiment, has a resting portion 302 having an essentially trapezoidal rectangular shape to be coupled to an essentially counter-shaped first portion 303 of a pole P4 having an essentially "T" section. In the present embodiment, the term "first portion 303" identifies two arms of the "T", while "second portion 310" of the pole P4 defined below identifies the third arm of the "T".

Figure 14:
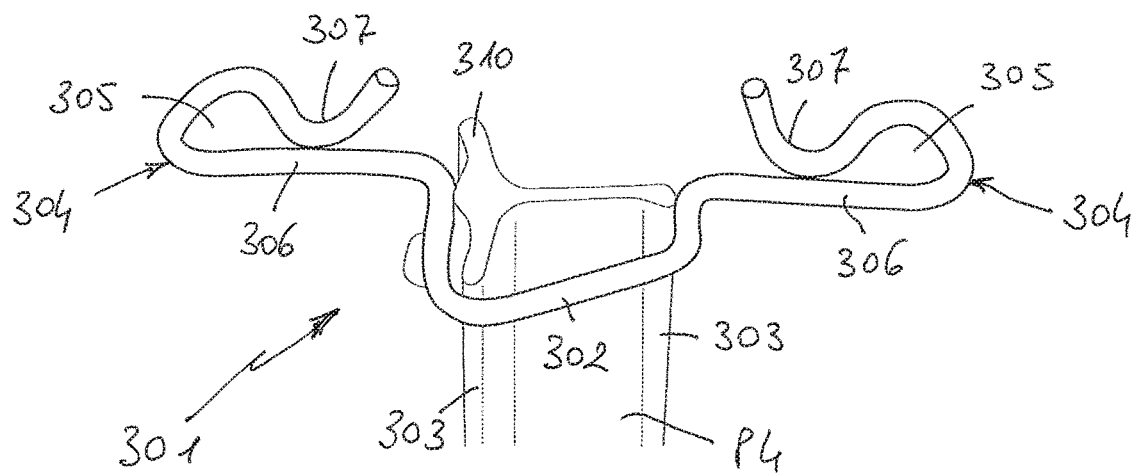
FIGS. 14 and 15 show, according to perspective views, a fourth embodiment of a supporting device according to the present invention.

Also in this case, the eyelets of the supporting means can be shaped as shown in FIG. 14, where the supporting means 304 are obtained by suitable bends at the opposite ends of the thread-like body so as to form a pair of eyelets 305 adapted to support a through wire and are joined to the resting portion 302 by respective substantially straight stretches 306 whose end portions 307 are advantageously bent to create an obstacle to the accidental escape of the containment wire passing through the eyelets 305, as already described above or, as exemplified in FIG. 17, they are "V"

shaped, resulting in a pair of eyelets 305A of similar shape and in which the end portions 307A are curled and configured to remain in contact, in use, with the pole P4 to create an obstacle the accidental escape of the containment wire.

Figure 15:
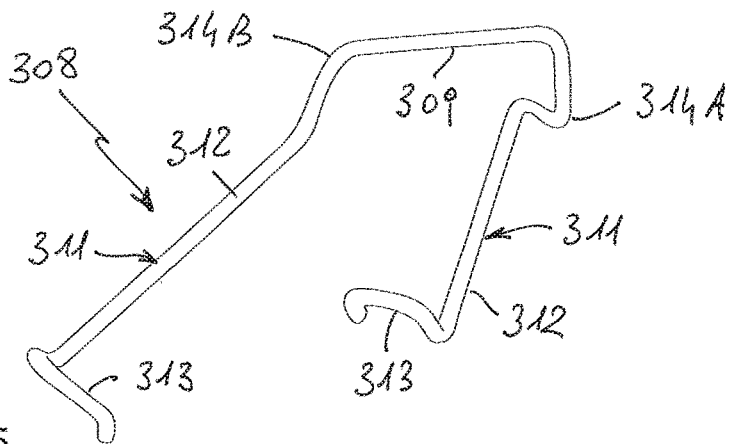

The pulling and anchoring element 308 illustrated in FIG. 15, which makes up the supporting device according to the present invention, includes an engagement portion 309 adapted to interact with at least a second portion 310 of the outer surface of pole P4, consisting of the third arm of the "T"-shaped pole opposite the other two arms forming the first portion 303, and elastically deformable anchoring means 311 which extend substantially perpendicularly from the opposite ends of the engagement portion 309; the anchoring means 311 comprise a pair of arms 312 whose free ends are bent to form respective hooks 310 adapted to anchor on the second portion 310 of the pole P4.

Advantageously, between the opposite ends of the engagement portion 309 and the respective arms 312 of the anchoring means 311, suitable engagement and centering 314A, 314B are provided for engaging the wire-holding element 301 in the optimal position in the area of the rectilinear stretches 306 adjacent to the engagement portion 302. The engagement and centering means 314A, 314B are obtained by bending the thread-like body to be essentially configured in the form of a "V", of which one, designated by 314A, extends essentially perpendicular to the engagement portion 309 while the other, indicated with 314B, extends substantially along the same lying plane as the engagement portion 309.

Figure 16:
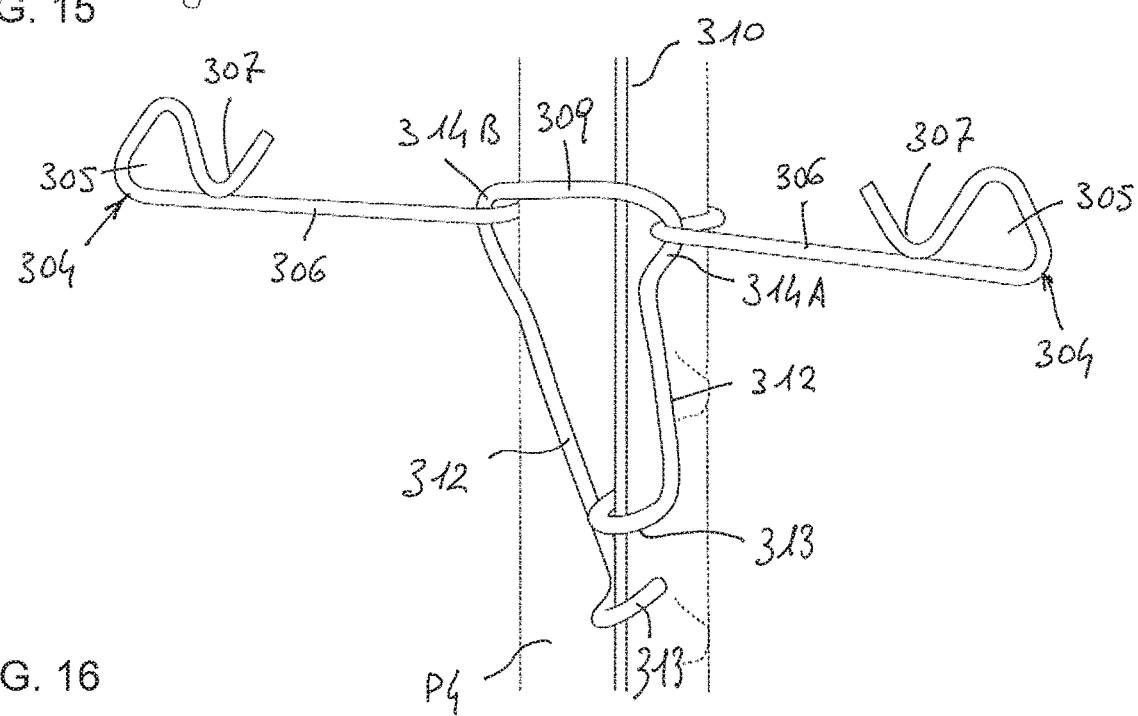
FIG. 16 shows the supporting device of the preceding embodiment applied to a supporting pole of a row of plants.
Figure 17:
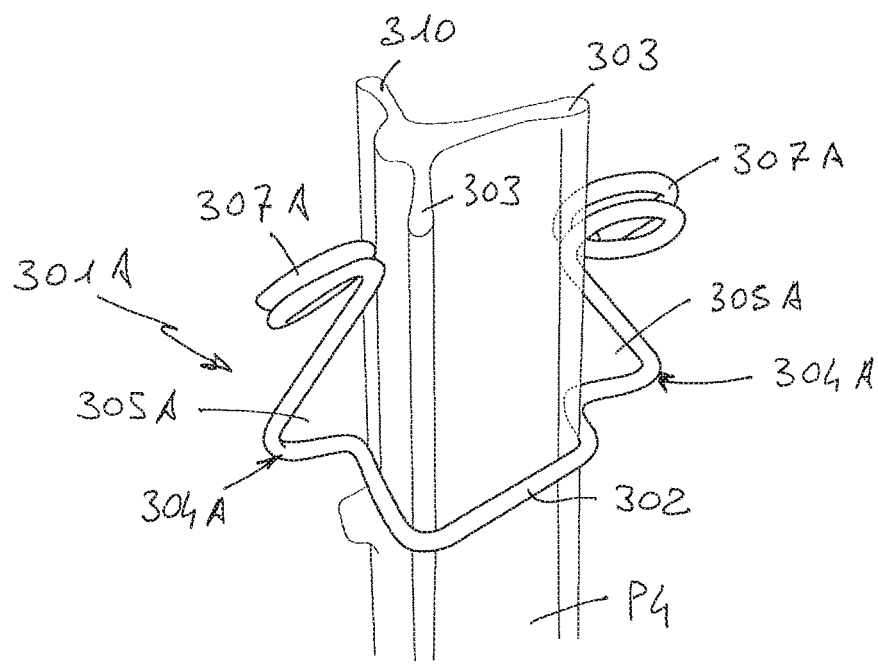
FIGS. 17 and 18 show an alternative embodiment with respect to the fourth embodiment illustrated in FIGS. 14 and 15.
Figure 18:
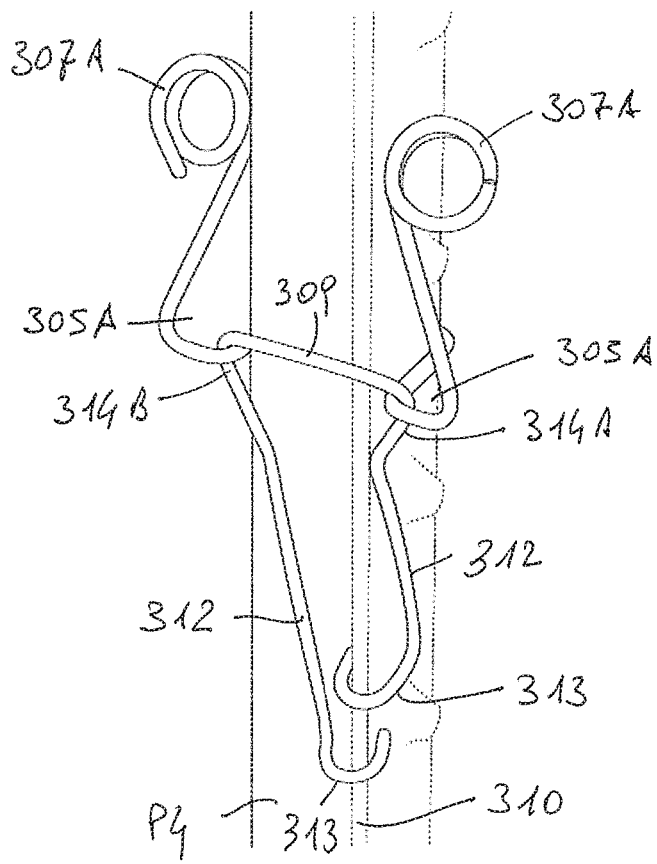

The functional and operative modes of the fourth embodiment are the same as those already described for the first embodiment, and the anchoring of the wire-holding element 301 on the pole P4 by means of the pulling and anchoring element 308 is shown in FIG. 16, while the anchoring of the alternative embodiment in FIG. 17 is shown in FIG. 18.

For all the embodiments described above, the length of the arms 12, 112, 212, 312 may be different from one another so that the hooks 13, 113, 213, 313 are arranged staggered to each other in order to impart a spring effect to the pulling and anchoring element when attached to the pole, so as to further increase the stability of the positioning of the wire-holding element along the pole itself.

Of course, the present invention is susceptible of numerous applications, modifications or variants without departing from the scope of protection defined by the appended claims.

Figure 19:
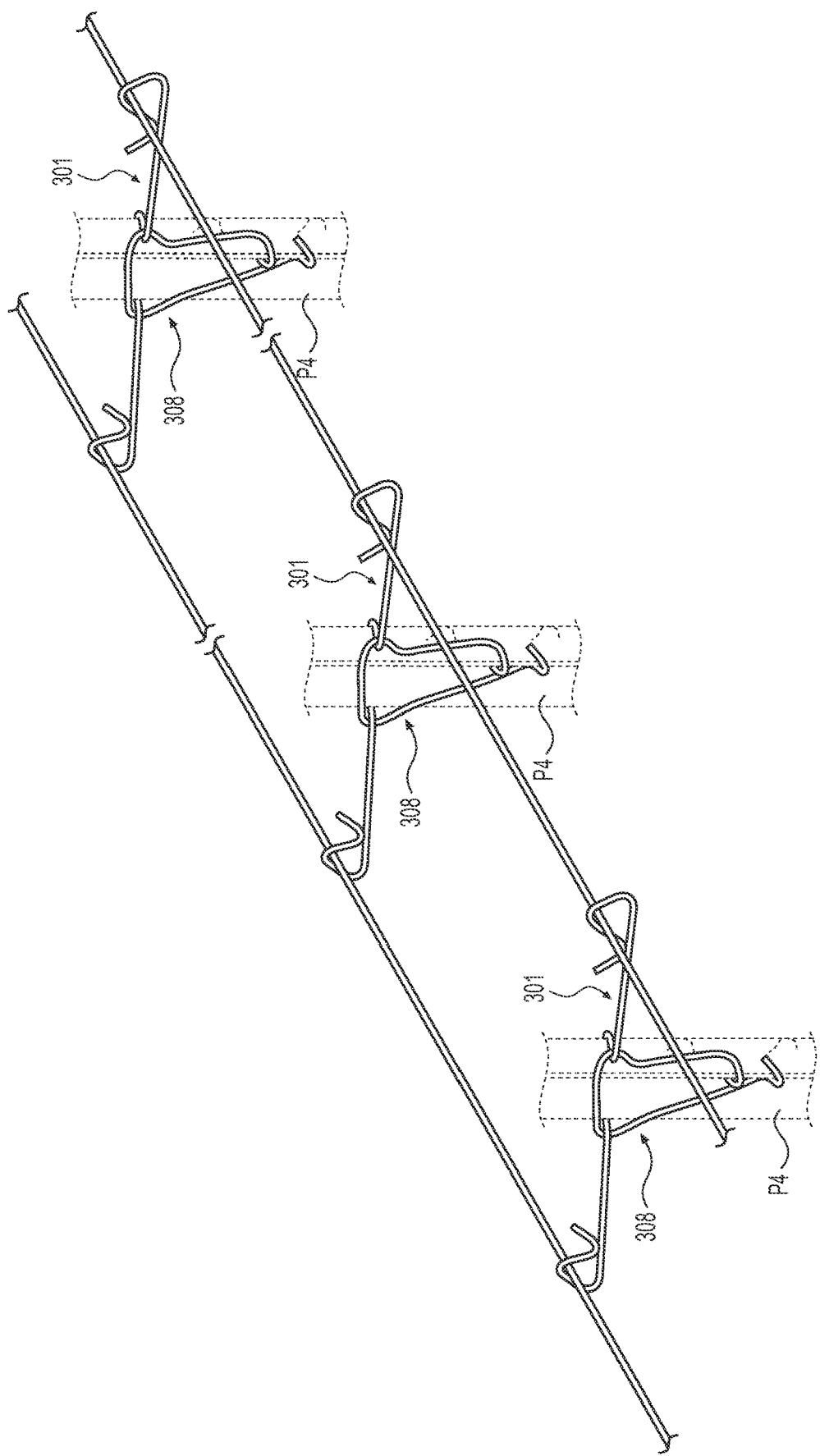
FIG. 19 shows a plurality of the supporting devices installed on a plurality of supporting poles of a row of plants.

For example, the supporting device on a supporting pole according to the present invention can be used, as well as for the removable fastening of wires for containing a row of plants, in applications belonging to different sectors, such as for example the removable fastening on a support pole of fencing nets, partition panels or other items that need a removable and easily adjustable support along the pole extension. In this case, the wire-holding element as described above is also adapted to support the fastening means of the item to be supported, such as a cable or a screw passing through the eyelets of the wire-holding element itself to support a mesh or panel, example in the industry or construction sector. As a further example, which is shown in FIG. 19, a plurality of containment wires may be used to span across a plurality of the supporting devices. Each of the plurality of the supporting devices are attached to one of a plurality of supporting poles.

The invention claimed is:

1. A supporting device configured to be arranged on a supporting pole, the supporting device comprising:
  a wire-holding element formed by a shaped threaded body including:
    a resting portion configured to be removably resting, in use, on at least a first portion of an outer surface of the supporting pole, and
    a supporting portion configured to support at least one containment wire extending from opposite sides of the resting portion; and
  a pulling and anchoring element formed by a shaped threaded body including:
    an engagement portion configured to engage, at least partially, in use, with at least a second portion of the outer surface of the supporting pole located opposite to the first portion, and
    elastically deformable anchoring means being a pair of mutually spaced arms which extend perpendicularly and from opposite sides with respect to the engagement portion, the mutually spaced arms having respective free ends shaped to anchor the anchoring means to the second portion of the outer surface of the supporting pole, the free ends being hooked free ends configured to directly contact and bend around the second portion of the outer surface of the supporting pole to engage with the second portion of the outer surface of the supporting pole, wherein
    the engagement portion of the pulling and anchoring element is configured to engage and apply, in use, a pulling force on the wire-holding element, which is configured to removably anchor the wire-holding element to the first portion of the outer surface of the supporting pole, the pulling force being achieved by the anchoring means engaging with the second portion of the outer surface of the supporting pole, and
    a tip of each of the hooked free ends directly contacts the second portion of the outer surface of the supporting pole.

2. The supporting device according to claim 1, wherein the pulling force is oriented, in use, towards the supporting pole.

3. The supporting device according to claim 1, wherein:
  the pulling and anchoring element includes two v-shaped engagement and centering means respectively located at each opposite end of the engagement portion between the respective anchoring means, each of the two engagement and centering means extending from the engagement portion to a bent end angled relative to the anchoring means, and
  the engagement and centering means is configured to hook and center the wire-holding element at the opposite sides of the resting portion.

4. The supporting device according to claim 3, wherein the engagement and centering means are configured to hook and center the wire-holding element at respective vertices of the engagement and centering means.

5. The supporting device according to claim 4, wherein the engagement and centering means extend in a direction perpendicular to the engagement portion.

6. The supporting device according to claim 4, wherein at least one of the engagement and centering means extends along a same lying plane as the engagement portion.

7. The supporting device according to claim 1, wherein the engagement portion:
  includes a first segment and a second segment arranged to form an angle, and
  is configured to interact, in use, with a triangular section of the second portion of the outer surface of the supporting pole.

8. The supporting device according to claim 1, wherein the resting portion is shaped to fit, in use, a counter-shaped section of the first portion of the outer surface of the supporting pole.

9. The supporting device according to claim 8, wherein the resting portion of the wire-holding element has an arched or isosceles trapezium shape.

10. The supporting device according to claim 8, wherein the resting portion of the wire-holding element has a rectangular trapezium shape to be fit, in use, to the first portion of the outer surface of the supporting pole having a "T" shaped section.

11. The supporting device according to claim 8, wherein the resting portion of the wire-holding element has a rectangular shape.

12. The supporting device according to claim 8, wherein the resting portion of the wire-holding element has a "W" shape.

13. A method for removably anchoring the supporting device in claim 1 to a supporting pole, the method comprising the steps of:
resting the resting portion of the wire-holding element on the first portion of the outer surface of the supporting pole;
inserting the anchoring means through the supporting pole so that the engagement and centering means engage and center the wire-holding element on the pulling and anchoring element; and
applying a pulling force to the anchoring means towards the second portion of the outer surface of the supporting pole so that the engagement portion of the pulling and anchoring element abuts the second portion of the outer surface of the supporting pole and the free ends of the pair of mutually spaced arms of the anchoring means anchor to the second portion of the outer surface by elastic deformation of the pair of mutually spaced arms.

14. The supporting pole of a row comprising at least one supporting device according to claim 1.

15. A plurality of the supporting devices according to claim 1, mounted on a plurality of intermediate poles for supporting containment wires.

16. A plurality of the supporting devices according to claim 1, wherein:
the hooked free ends bend around the second portion of the outer surface at respective locations which are aligned along a longitudinal direction of the supporting pole,
the hooked free ends include a first hooked free end and a second hooked free end,
the respective locations include a first respective location and a second respective location, and
the tip of the first hooked free end bends around the second portion at the first respective location and the tip of the second hooked free end bends around the second portion at the second respective location.

* * * * *